R. B. CALCUTT.
TIRE FOR VEHICLES.
APPLICATION FILED SEPT. 19, 1910.
1,100,712.
Patented June 23, 1914.
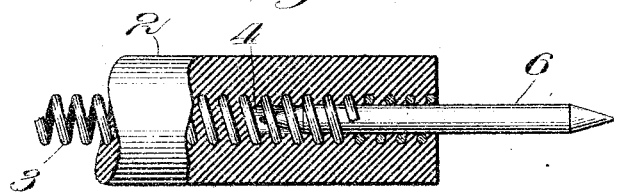 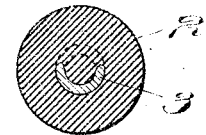
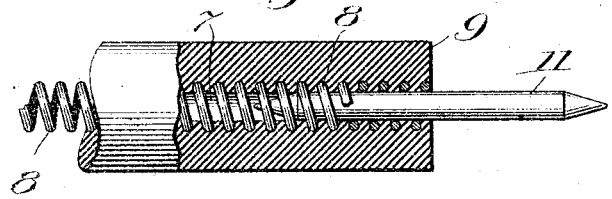 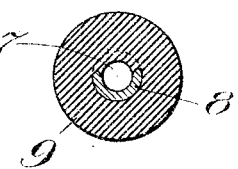
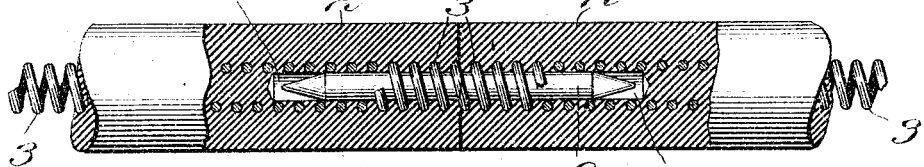
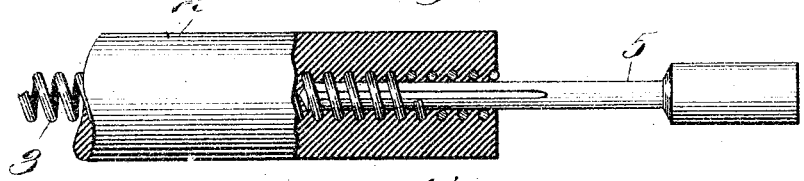
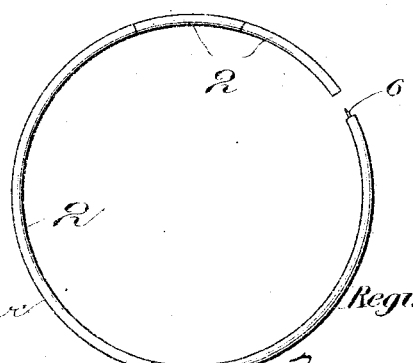
Witnesses:
Harry S. Gaither
E. H. Lundy
Inventor:
Reginald B. Calcutt
by Frank D. Thomason
Atty

UNITED STATES PATENT OFFICE.

REGINALD B. CALCUTT, OF CHICAGO, ILLINOIS.

TIRE FOR VEHICLES.

1,100,712.  Specification of Letters Patent.  Patented June 23, 1914.

Application filed September 19, 1915. Serial No. 582,597.

*To all whom it may concern:*

Be it known that I, REGINALD B. CALCUTT, a citizen of the United States, residing at Chicago, in the county of Cook and State of Illinois, have invented new and useful Improvements in Tires for Vehicles, of which the following is a full, clear, and exact description.

My invention relates to tires for the wheels of vehicles and more particularly to cushion tires for light vehicles, such as baby carriages, go-carts, toy-wagons, and the like.

The principal object of my invention is to provide a tire which is made of "stock" material that is manufactured in lengths of, say twenty-five or fifty feet, and then cut into the necessary length to construct a tire of any desired circumference.

Another object is to enable the manufacturer to sell this stock material for tires to the dealer in such lengths as to enable the latter to construct the tire by cutting off as much of this length of material as may be necessary to tightly fit into the rim of the wheel and to bring the ends of said stock together and couple them as hereinafter explained. And another object is to enable the dealer to take several short lengths of this "stock" material and by bringing their ends together and coupling them, piece out a sufficient length of said material to make a tire of the desired circumference. There is therefore no waste of material, no remnants, and the necessity of keeping on hand made-up tires of different sizes for wheels of various diameters is obviated.

Still another object is to provide a unique coupler device for joining these lengths together which can be easily manipulated by the user when making up a tire. Thus, it will be seen that great economy and simplicity of construction, as well as convenience for both the dealer and user results from the novel construction herein contemplated.

These objects I accomplish by the means and in the manner hereinafter fully described and as more particularly pointed out in the claims, reference being had to the accompanying drawings, forming a part of this specification.

Figure 1 is a side elevation, partially in longitudinal section, of a short straight length of the "stock" material used in making up a tire, and Fig. 2 is a vertical transverse section of the same. Fig. 3 is one similar to Fig. 1 of a slightly modified construction wherein the axial bore of the "stock" material extends through the entire length of the same, and Fig. 4 is a vertical transverse section thereof. Fig. 5 is a longitudinal axial section of a portion of a tire showing the ends thereof after the same have been joined together. Fig. 6 is an end view of one end of the "stock" material showing the act of the operator drilling, or similar tool, boring out the central axial portion of the tire for the purpose of inserting the coupler. Fig. 7 is a side elevation of a coupled tire showing the same made up of several pieces of "stock" material.

The several figures of the drawings represent sections of my improved cushioned tire which consists of a substantially cylindrical body of rubber or equivalent material, and an axial core of coiled wire extending the full length of said body. In Figs. 1, 2, 5, and 6, in part, it is shown to be solid, and the wire 3, threaded spirally through the same, but the ends of the tire are provided with an axial bore 4, which is made by a suitable tool, 5, as shown in Fig. 6 of the drawings, and extends into the same, and the inner diameter of the coiled wire, preferably, not more than one inch. The coiled wire, 3, thus forms the skeleton of said body and maintains the shape of the same. Now this body is manufactured in continuous lengths of, say, twenty-five feet to fifty feet. These lengths are sold to the dealer and when a tire is to be made of a certain circumference, the dealer cuts off a sufficient length of material to make the same, joins the ends thereof together, and then couples said ends together as at 6. The coupler consists of a wire of a diameter corresponding to that of the bore 4, and preferably has its ends pointed, and to effect a coupling it is forced into the bore at one end of the tire about one-half its length, and then the other half of it is forced into the bore at the other end of the tire until the two ends of said tire meet. The circumference of the completed tire, and the slight expansion of the body of the tire by the coiled wire when stretched upon the wheel causes the surrounding material of the tire to constrict and tightly embrace the key 6, and lock said ends together tightly.

If desired, the body of the tire can be made tubular throughout, and provided with a bore 7, extending from end to end of the same as shown in Figs. 3 and 4 of the drawings, with the coiled wire 8 forming the skeleton of the walls of said bore, thus avoiding the necessity of boring out the ends of the tire for a distance sufficient to accommodate the key. It will be understood that the making of a continuous bore surrounded by the coiled wire 8 is not for the purpose of inflation or cushioning, but solely for the purpose of affording a means for permitting the use of the key 11 to connect the ends of the body of the tire together, no matter at what point along the length of the "stock" originally manufactured it may be cut to make the tire. In this event a key 11, corresponding to key 6, is employed, and in a similar manner. I much prefer, however, to make the body of the tire solid, as it is much less likely to split longitudinally when subjected to heavy usage and the rubber of its body will not work loose from the wire.

Another feature which my invention makes possible is the making of a tire of several sections. If a remnant of the twenty-five feet of "stock" material is left on hand, the dealer can work it in as a part of the tire just as well as he can join the ends of one continuous length. In fact the tire may be made of any number of these remnants substantially as shown in Fig. 7, and nothing allowed to go to waste.

What I claim as new is:—

1. As a new article of manufacture, a tire comprising an open coiled wire constituting the skeleton of the axial core thereof, an integral rubber casing consisting of a single thickness from center to circumference having bores in the ends thereof the material of which fills between and interlocks with said coils, and a coupler consisting of a short section of wire having a substantially smooth exterior and adapted to enter the ends of the coiled wire core of said tire.

2. As an article of manufacture, a tire comprising an open coiled wire constituting the skeleton of the axial core thereof, an integral rubber casing consisting of a single thickness from center to circumference having bores in the ends thereof the material of which fills between and interlocks with said coils, and a coupler consisting of a short section of wire adapted to enter the ends of said coiled wire core and engaged thereby.

In witness whereof I have hereunto set my hand this 13th day of September, A. D. 1910.

REGINA B. CALCUTT.

Witnesses:
FRANK D. THOMASON,
E. K. LUNDY.